US006691251B2

(12) United States Patent
Wong (10) Patent No.: US 6,691,251 B2
(45) Date of Patent: Feb. 10, 2004

(54) ON-CHIP DEBUGGING SYSTEM EMULATOR

(75) Inventor: Yoon Kean Wong, Menlo Park, CA (US)

(73) Assignee: PalmSource, Inc., Sunnyvale, CA (US)

( * ) Notice: Subject to any disclaimer, the term of this patent is extended or adjusted under 35 U.S.C. 154(b) by 512 days.

(21) Appl. No.: 09/727,255

(22) Filed: Nov. 30, 2000

(65) Prior Publication Data

US 2002/0099977 A1 Jul. 25, 2002

(51) Int. Cl.$^7$ ................................................ G06F 11/00
(52) U.S. Cl. .............................. 714/28; 714/40; 703/27
(58) Field of Search ............................. 714/28, 31, 33, 714/40; 703/23, 27

(56) References Cited

U.S. PATENT DOCUMENTS

| 5,754,827 | A | | 5/1998 | Barbier et al. ............... 395/500 |
| 6,480,952 | B2 | * | 11/2002 | Gorishek et al. ............ 712/227 |
| 6,516,428 | B2 | * | 2/2003 | Wenzel et al. ................. 714/28 |
| 6,557,116 | B1 | * | 4/2003 | Swoboda et al. .............. 714/28 |
| 2002/0059542 | A1 | * | 5/2002 | Debling ......................... 714/28 |

OTHER PUBLICATIONS

Rick Leatherman. "On–Chip Instrumentation Approach to System–On–Chip Development".http://www.fs2.com/pdfs/OCI_Whitepaper.pdf.Jul. 22, 2000.*
"System verification: essential for digital wireless system–on–chip (SOC) designs". http://www.eetasia,com/ARTICLES/1999SEP/1999SEP09_ST_SMT_TAC.PDF. 1999.*
"Cut Based Functional Debugging for Programmable Systems–on–Chip" IEEE. Feb. 2000.*
Nath, Manju, "On–Chip Debugging Reaches A Nexus", techtrends, May 11, 2000, pps. 95–96, 98 and 100.
Haller, Craig A., "The ZEN of BDM," © Copyright 1996–97 Macraigor Systems, Inc., pps. 1–15.
Neugass, Henry, "Approaches to on–chip debugging," Computer Design, Dec. 1998, pps. 1–11; printed from the following website: www.computer–design.com/Editorial/1998/12/TDP/decdebug.html on Nov. 9, 2000.
ARM7DMI Data Sheet, Document No.: ARM DDI 0029E, Issued: Aug. 1995, © Advanced RISC Machines Ltd. (ARM) 1995, Table of Contents and Sec. 8.1 entitled "Debug Interface," pps. i–v and 8–2 to 8–30.
Young, Johnny, "JTAG/IEEE 1149.1—Design Considerations," Application Report, pps. i–iv and 1–11, © 1996, Texas Instruments Incorporated.
Daniel, Wayne, "Design Tradeoffs When Implementing IEEE 1149.1," pps. i–iv and 1–10, © Jan. 1997, Texas Instruments Incorporated.

* cited by examiner

Primary Examiner—Robert Beausoliel
Assistant Examiner—Yolanda L Wilson
(74) Attorney, Agent, or Firm—Foley & Lardner (57) ABSTRACT

An on-chip debugging system emulator is disclosed. The on-chip debugging system emulator includes an on-chip debugging host processor. The on-chip debugging system emulator also includes an on-chip debugging emulator processor configured to emulate the on-chip debugging functions of a silicon chip. The on-chip debugging system emulator includes a hardware interface between the on-chip debugging host processor and the on-chip debugging emulator processor.

21 Claims, 1 Drawing Sheet

ON-CHIP DEBUGGING SYSTEM EMULATOR

FIELD OF THE INVENTION

The disclosure relates to an on-chip debugging system emulator. Further, the disclosure relates to an on-chip debugging system emulator in which a computer program is configured to run on the processor of a computing device and is configured to emulate the on-chip debugging functions of a silicon chip having an on-chip debugging system.

BACKGROUND OF THE INVENTION

Processor vendors, selling silicon chip devices, have provided on-chip debugging (OCD) circuitry to improve the process of high-end embedded processor development. In general, on-chip debugging is a combination of hardware and software, both on and off the chip. The portion which resides on the chip may be implemented in various ways. For example, it may be a microcode based monitor (Motorola CPU 32, e.g.) or hardware implemented resources (IBM PPC403, e.g.). Further, there may be resources used that are available to the end-user's code such as breakpoint registers (most embedded power PC implementations, e.g.) or dedicated hardware purely used by the OCD such as instruction stuff buffers (also in embedded power PC implementations, e.g.).

An exemplary prior art OCD system emulation solution uses field programmable gate arrays (FPGAs). The circuit or chip design to be emulated is realized on the FPGA emulation system by compiling a "formal" description of the circuit design, and mapping the circuit design out of the logic elements of the FPGA.

Figure 1:
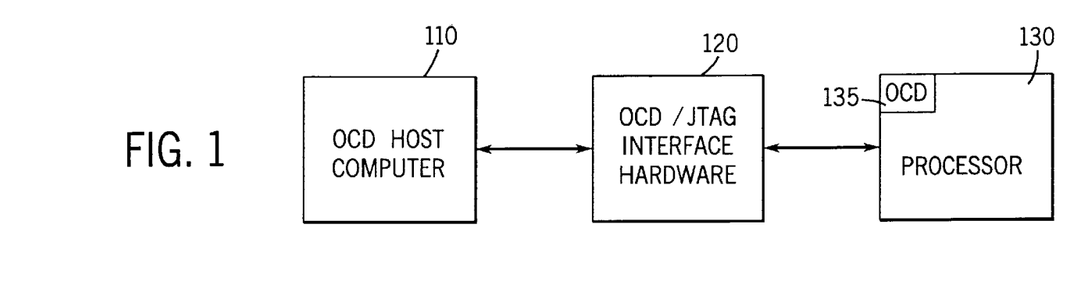
FIG. 1 is a block diagram of an on-chip debugging system of the prior art.

On-chip debugging requires some external hardware. For example, there must be a communications interface between the chip and the debugger host. In most cases this is via a dual-row pin header and several pins on the processor. For example, FIG. 1 depicts a system 100 of the prior art. On-chip debugging system 100 includes an on-chip debugging host computer 110 coupled to and in communication with an on-chip debugging interface hardware 120 which may be a Joint Test Action Group (JTAG) interface, that is an interface configured to utilize the IEEE 1149.1 JTAG test instruction standard.

JTAG is an IEEE specification (IEEE 1149.1). JTAG is a method for doing full chip testing and was originally implemented to allow testing of all the pin connections of a chip and its interconnections to other chips on a circuit board. JTAG is a serial protocol and chips on the board may be daisy-chained together. The JTAG serial chain through the chip may be wired through any on-chip devices but typically minimally connects to all the I/O pins and buffers.

In on-chip debugging devices, using the IEEE 1149.1 JTAG test instruction set, host computer 110 is typically connected to interface 120 that translates from signals that the host computer 110 understands to an interface and signals that a silicon chip 130 can understand, and host computer 110 provides the ability to query and set information within microchip 130. This on-chip debugging ability is useful when developing software for or programming for a silicon chip or other processing device.

OCD interface hardware 120 is coupled to and in communication with a silicon chip device or processor 130 having OCD resources (hardware and software, e.g.) 135 dedicated to on-chip debugging processes. OCD interface 120 in many cases uses a dual-row pin header and several pins on the processor to communicate between OCD host computer 110 and processor 130. For example, the IBM 403 family uses the JTAG port pins, in addition to RESET, power sense and ground, and connects via a 16-pin dual-row header. Motorola background debug mode (BDM) typically uses five dedicated pins (sometimes multiplexed with real-time execution functions), power, ground, and at least one RESET, all terminating in a 10-pin dual-row header. Many of the DSP chips use a Texas Instrument style standard JTAG interface. Motorola further, has expanded the interface's internal definition to include its DSP BDM equivalent (referred to as OnCE). However, other hardware interface architectures may be used.

To provide debugging of processor 130, OCD host computer 110 is also required. The host computer 110 runs the debugger software and interfaces to the OCD header in various ways. The debugger on OCD host computer 110 implements the user interface displaying, for example, the program code for processor 130, processor resources, target memory, etc. The hardware interface 115 between OCD host computer 110 and OCD interface hardware 120 may be any of a variety of types, including, RS-232, high speed parallel ports, ethernet, ISA bus interfaces, etc.

Companies developing software and hardware tools to debug microchips, such as processor 130 and other microchips and silicon chips such as through the IEEE 1149.1 JTAG test instruction set, or other instruction sets, are often posed with the problem of having to develop software and hardware for a microchip that does not yet exist, or is unavailable.

Accordingly, there is a need for an emulator which mimics the functionality of the debugging portion, for example OCD 135, of the microchip, thereby allowing the software or hardware vendors to develop their products for chips which do not yet exist or are unavailable.

SUMMARY OF THE INVENTION

An exemplary embodiment relates to an on-chip debugging system emulator. The on-chip debugging system emulator includes an on-chip debugging host processor. The on-chip debugging system emulator also includes an on-chip debugging emulator processor configured to emulate the on-chip debugging functions of a silicon chip. Further, the on-chip debugging system emulator includes a hardware interface between the on-chip debugging host processor and the on-chip debugging emulator processor.

Another exemplary embodiment relates to an on-chip debugging system emulator. The on-chip debugging system emulator includes an on-chip debugging host processor running software to display on-chip debugging emulation information. The on-chip debugging system emulator also includes an on-chip debugging emulator processor running software to emulate the on-chip debugging functions of a silicon chip. Further, the on-chip debugging system emulator includes a hardware interface between the on-chip debugging host processor and the on-chip debugging emulator processor.

Yet another exemplary embodiment relates to an on-chip debugging emulator. The on-chip debugging emulator includes a processor and a memory device coupled to the processor. The on-chip debugging emulator also includes an interface coupled to the processor, the interface configured to be coupled to an on-chip debugging host device. Further, the on-chip debugging emulator includes a software program configured to run on the processor and configured to emulate the on-chip debugging functions of a silicon chip.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 2:
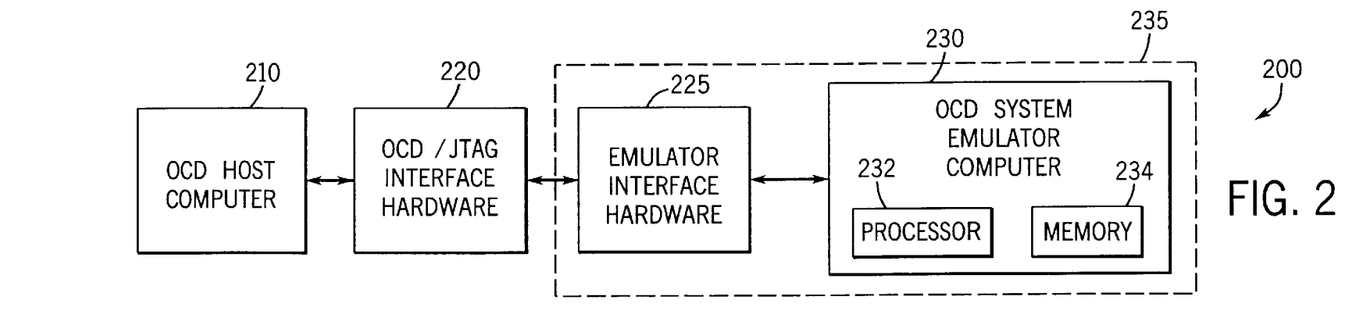
FIG. 2 is a block diagram of an exemplary embodiment of an on-chip debugging system emulator.

Referring to FIG. 2, a block diagram of an exemplary embodiment of an on-chip debugging system emulator 200 is depicted. System 200 includes an OCD host computer 210, an OCD hardware interface 220, an emulator hardware interface 225 and an OCD system emulator computer 230.

In an exemplary embodiment, OCD host computer 210 may be any of a variety of interface devices providing user interaction, such as display functionality, including, but not limited to, any of a variety of computers, personal computers, laptop computers, personal digital assistants, hand-held computers, and other devices. Also, in an exemplary embodiment, OCD hardware interface 220 may be a JTAG interface, or other interfaces compatible with various test standard protocols or custom test standard protocols. OCD hardware interface 220 is interface hardware that translates signals from interface signals which the silicon chip understands (such as chip 130 of FIG. 1) to a format that a computer or processing unit such as OCD host computer 210 can understand. Emulator interface hardware 225 is a hardware interface which couples an OCD hardware interface 220 to an OCD system emulator computer. Emulator interface hardware 225 converts JTAG interface hardware signals to OCD system emulator computer signals.

In the exemplary embodiment depicted in FIG. 2, a combination 235 of emulator interface hardware 225 and OCD system emulator computer 230 is a hardware and/or software representation (emulation) of OCD 135 described with reference to FIG. 1. OCD system emulator computer 230 may be embodied in any of a variety of computers or processing units including, but not limited to, computers, personal computers, notebook computers, personal digital assistants, hand-held computers and the like. OCD system emulator computer 230 includes a processor 232 and memory 234. OCD system emulator computer 230 is configured with software, which may be stored in memory 234 and run on processor 234, that mimics the functionality of the OCD portion of the real microchip, silicon chip, or processor of interest. A computer program listing of exemplary software running on processor 232 to emulate OCD system 135 is provided as Appendix A. It should be noted that the invention is not limited to the computer-program listing nor to the programming language used. Any of a wide variety of techniques, methods, languages, and data structures may be used to provide the functionalities of OCD system emulator computer 230.

OCD system emulator computer 230 is configured to provide the same sort of feedback as would OCD 135 on a real silicon chip. OCD system emulator computer 230 is configured to accept and return signals as the real silicon chip would, possibly, but not necessarily, at a slower rate than the real chip. OCD system emulator computer 230 may be configured to provide additional functionality by providing an interface, whether visual, conceptual, or via software application programmer interfaces (APIs), or the like, to the areas of the emulated microchip that the silicon test hardware would access in a real world case. By utilizing emulator system 200 a toolchain developer would be provided with the ability to view results of the debugging software on the emulator, as if the emulator were a real silicon chip having an OCD system. OCD system emulator computer 230 is distinct from hardware emulators, which emulate the microchip that provide complete emulation/simulation of the microchip itself (usually in a field programmable gate array (FGPA)), in that the software emulator provides access to and has the ability to manipulate the results of a debugging action, whereas the standard FPGA approach does not generally allow access to the internals of the FPGA with the ability to query individual components of the emulated microchip, except through the test system that is being developed. Further, the software running on OCD system emulator computer 230 is distinct from computer software emulators of the microchip that allow testing of the debugging software of the toolchain, but not of the hardware portion of the toolchain (the interface box), for example emulator hardware interface 225.

Figure 3:
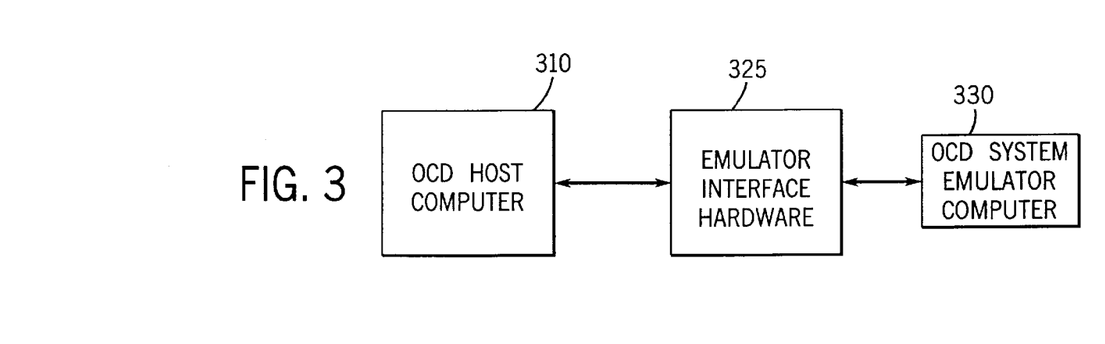
FIG. 3 is a block diagram of another exemplary embodiment of an on-chip debugging system emulator.

With reference to FIG. 3, another exemplary embodiment of on-chip debugging emulator system 300 is depicted. System 300 includes an OCD host computer 310, an emulator hardware interface 325, and an OCD system emulator computer 330. System 300 works essentially the same as system 200, depicted in FIG. 2, except that emulator hardware interface 325 translate directly from the signals that OCD host computer 310 sends out to signals that OCD system emulator computer 330 can understand, without the OCD JTAG hardware interface 220, as depicted in FIG. 2. Emulator interface hardware 325 is simply an interface between OCD host computer 310 and OCD system emulator computer 330 which is designed to be an interface which talks natively to host computer 310.

While the detailed drawings, specific examples, and particular formulations given describe exemplary embodiments, they serve the purpose of illustration only. The hardware and software configurations shown and described may differ depending on the chosen performance characteristics and physical characteristics of the computing devices, and interface hardware. For example, the type of interface hardware, and the number of separate interface devices, as well as the computing devices used may differ. The systems shown and described are not limited to the precise details and conditions disclosed. Furthermore, other substitutions, modifications, changes and omissions may be made in the design, operating conditions and arrangement of the exemplary embodiments without departing from the scope of the invention as expressed in the appended claims.

APPENDIX A

```
/************************************************************************
 *
 * Core Palm OS Code for JTAG device emulator
 *
 * Copyright (c) 2000 Palm Inc. or its subsidiaries.
 * All rights reserved.
 *
 ***********************************************************************/

/************************************************************************
 *
 * Global variables
 *
 ***********************************************************************/ define BoundaryScanChainLength    268      // length in bits
define Proc1ScanChainLength       131      // length in bits
// All scan chain buffers are assigned as UInt8
UInt8  BoundaryScanChainBuffer[BoundaryScanChainLength];
UInt8  Proc1ScanChainBuffer[Proc1ScanChainLength];
// All TAPs in same state (common TMS)
enum TAPStates {Test_Logic_Reset, Run_Test_Idle, Select_DR_Scan, Capture_DR, Shift_DR,
Exit1_DR, Pause_DR, Exit2_DR, Update_DR, Select_IR_Scan, Capture_IR, Shift_IR, Exit1_IR,
Pause_IR, Exit2_IR, Update_IR} TAPState;
// This TAP register approach yields more code, but faster execution (minimal bit bashing)
enum Proc1TAPIRStates {Proc1_Extest, Proc1_HighZ, Proc1_Sample_Preload, Proc1_0011,
Proc1_Clamp, Proc1_0101, Proc1_Private, Proc1_0111, Proc1_1000, Proc1_1001, Proc1_1010,
Proc1_1011, Proc1_1100, Proc1_1101, Proc1_1110, Proc1_Bypass} Proc1TAPIRState;
enum BoundaryTAPIRStates {Boundary_Extest, Boundary_IDCode, Boundary_Sample_Preload,
Boundary_Intest, Boundary_Clamp,Boundary_HighZ, Boundary_0110, Boundary_0111,
Boundary_1000, Boundary_1001, Boundary_1010, Boundary_1011, Boundary_1100,
Boundary_1101, Boundary_1110, Boundary_Bypass} BoundaryTAPIRState;
UInt32  BoundaryDeviceIDRegister;
Boolean BoundaryBypassed;
Boolean Proc1Bypassed;
UInt16  PortID;              // serial port ID
UInt8   TMSBit;              // Global last received bits
UInt8   TDIBit;
UInt8   TDOBit;
UInt8   RSTBit;
/************************************************************************
 *
 * Internal Constants
 *
 ***********************************************************************/
#define BoundaryDeviceID        0x87654321
/************************************************************************
 *
 * Internal Functions
 *
 ***********************************************************************/
static void    ResetStateMachine(void);
static void    ReceiveSerData(UInt32 delay);
void           UpdateStateMachine(void);
/************************************************************************
 *
 * FUNCTION:  ReceiveSerData
 *
 * DESCRIPTION: This checks for, receives and buffers any serial data.
 *
 * PARAMETERS: delay - time in sysTicks to check/wait for serial data.
 *
 * RETURNED:
 *
 *
 * REVISION HISTORY:
 *
 *
 ***********************************************************************/
static void ReceiveSerData(UInt32 delay)
{
    Err        err;
    UInt8      serRxBuffer[1000];
    UInt16     serRxCount = 0;
    UInt16     index;
    UInt32     numBytesP;
    SrmReceiveCheck(PortID, &numBytesP);
    while(numBytesP)
        {
```

APPENDIX A-continued

```
        if (((serRxCount = SrmReceive(PortID, &serRxBuffer, numBytesP, delay, &err))
> = 1)
                && (err = = 0))
                {
                for (index = 0; index < serRxCount; index + + )
                    {
                    // For each byte received, save in buffers.
                    // Store bits to buffers.
                    TDIBit = (serRxBuffer[index] & 0x2)> > 1;
                    TMSBit = (serRxBuffer[index] & 0x4)> > 2;
                    RSTBit = (serRxBuffer[index] & 0x10)> > 4;
                    // All XXXBit variables now 0 or 1
                    if (RSTBit = = 1)
                        {
                        ResetStateMachine();
                        SrmReceiveFlush(PortID, SysTicksPerSecond()/4);
                        FrmUpdateForm(FrmGetActiveFormID(), 0);
                        return;
                        }
                    UpdateStateMachine();
                    SrmSend(PortID, &TDOBit, 1, &err);
                    }
                }
            if (SrmReceiveWait(PortID, 1, SysTicksPerSecond()/10) != 0)
                FrmUpdateForm(FrmGetActiveFormID(), 0);
            SrmReceiveCheck(PortID, &numBytesP);
            }
    return;
}
/**************************************************************************
 *
 * FUNCTION:    UpdateStateMachine
 *
 * DESCRIPTION: This function updates the state machine with the results
 *              of the new serial data received.
 *
 * PARAMETERS: none
 *
 * RETURNED: state machine globals are updated.
 *
 * REVISION HISTORY:
 *
 **************************************************************************/
static void UpdateStateMachine(void)
{
    UInt8  oldHighBit = 0;
    UInt16 index;
    UInt8  TmpProc1CmdReg = 0;
    // Get new TMS and TDI bits from TMSBit, TDIBit
    switch (TAP State)
        {
        case Test_Logic_Reset:
            if (TMSBit == 0)
            TAPState = Run_Test_Idle;
            return;
        case Run_Test_Idle:
            if (TMSBit = = 1)
                TAPState = Select_DR_Scan;
            return;
        case Select_DR_Scan:
            if (TMSBit = = 0)
                TAPState = Capture_DR;
            else
                TAPState = Select_IR_Scan;
            return;
        case Capture_DR:
            if (BoundaryTAPIRState != Boundary_Bypass)
                {
                switch (BoundaryTAPIRState)
                    {
                    case Boundary_Extest:
                        // Load input data onto the scan chain
                        break;
                    case Boundary_Intest:
                        // Load output data from the internal pins
                        break;
                        case Boundary_Clamp:
                            BoundaryBypassed = false;
                            break;
```

APPENDIX A-continued

```
                    case Boundary_HighZ:
                        BoundaryBypassed = false;
                        break;
                    case Boundary_Sample_Preload:
                        // Load pin data and system data into scan chain
                        // Load pin data and system data out from scan chain
                        break;
                }
            }
            else if (Proc1TAPIRState != Proc1_Bypass)
            {
                switch (Proc1TAPIRState)
                {
                    case Proc1_Extest:
                        // Load input data onto the scan chain
                        SetProc1ExtInputModel();
                        break;
                    case Proc1_Clamp:
                        Proc1Bypassed = false;
                        break;
                    case Proc1_HighZ:
                        Proc1Bypassed = false;
                        break;
                    case Proc1_Sample_Preload:
                        // Load pin data and system data into scan chain
                        break;
                }
            }
            if (TMSBit = = 0)
                    TAPState = Shift_DR;
            else
                    TAPState = Exit1_DR;
            return;
    case Shift_DR:
            if (TMSBit = = 1)
                {
                TAPState = Exit1_DR;
                return;
                }
            if (BoundaryTAPIRState ! = Boundary_Bypass)
                {
                switch (BoundaryTAPIRState)
                    {
                    case Boundary_Extest:
                    case Boundary_Infest:
                    case Boundary_Sample_Preload:
                        TDOBit = (Proc1Bypassed = = true);
                        Proc1Bypassed = (BoundaryScanChainBuffer[BoundaryScanChainLength - 1]) & 0x1;
                        // Do slow shift for now - change to 2 * buffer length and swap.
                        for (index = (BoundaryScanChainLength - 1); index > 0; index--)
                            BoundaryScanChainBuffer[index] = BoundaryScanChainBuffer[index-1];
                        BoundaryScanchainBuffer[0]= TDIBit;
                        break;
                    // Shift out BoundaryDeviceID
                    case Boundary_IDCode:
                        TDOBit = (Proc1Bypassed = = true);
                        Proc1Bypassed = (BoundaryDeviceIDRegister & 0x00000001);
                        BoundaryDeviceIDRegister = BoundaryDeviceIDRegister> > 1;
                        BoundaryDeviceIDRegister = BoundaryDeviceIDRegister & 0x7FFFFFFF;
                        BoundaryDeviceIDRegister = BoundaryDeviceIDRegister | ((TDIBit = = 1)< <30);
                        break;
                    case Boundary_Clamp:
                    case Boundary_HighZ:
                        TDOBit = (Proc1Bypassed = = true);
                        Proc1Bypassed = (BoundaryBypassed = = true);
                        BoundaryBypassed = (TDIBit = = 1);
                        break;
```

APPENDIX A-continued

```
            }
        }
        if (Proc1TAPIRState ! = Proc1_Bypass)
        {
            switch (Proc1TAPIRState)
            {
                case Proc1_Extest:
                case Proc1_Sample_Preload:
                    TDOBit =
(Proc1ScanChainBuffer[Proc1ScanChainLength - 1]) & 0x1;
                    // Do slow shift for now - change to 2 * buffer length and swap.
                    for (index = (Proc1ScanChainLength - 1); index > 0; index--)
                        Proc1ScanChainBuffer[index] = Proc1ScanChainBuffer[index-1];
                    Proc1ScanChainBuffer[0] = (BoundaryBypassed = = true);
                    BoundaryBypassed = TDIBit;
                    break;
                case Proc1_Clamp:
                case Proc1_HighZ:
                    TDOBit = (Proc1Bypassed = = true);
                    Proc1Bypassed = (BoundaryBypassed = = true);
                    BoundaryBypassed = (TDIBit = = 1);
                    break;
            }
        }
        if ((BoundaryTAPIRState = = Boundary_Bypass) && (Proc1TAPIRState = = Proc1_Bypass))
        {
            TDOBit = (Proc1Bypassed = = true);
            Proc1Bypassed = (BoundaryBypassed = = true);
            BoundaryBypassed = (TDIBit = = 1);
        }
        return;
    case Exit1_DR:
        if (TMSBit = = 0)
            TAPState = Pause_DR;
        else
            TAPState = Update_DR;
        return;
    case Pause_DR:
        if (TMSBit = = 1)
            TAPState = Exit2_DR;
        return;
    case Exit2_DR:
        if (TMSBit = = 0)
            TAPState = Shift_DR;
        else
            TAPState = Update_DR;
        return;
    case Update_DR:
        if (BoundaryTAPIRState ! = Boundary_Bypass)
        {
            switch (BoundaryTAPIRState)
            {
                case Boundary_Extest:
                    // Load output data from the scan chain
                    break;
                case Boundary_Intest:
                    // Load input data from the scan chain
                    break;
            }
        }
        if (TMSBit = = 0)
            TAPState = Run_Test_Idle;
        else
            TAPState = Select_DR_Scan;
        return;
    case Select_IR_Scan:
        if (TMSBit = = 0)
            TAPState = Capture_IR;
        else
            TAPState = Test_Logic_Reset;
        return;
    case Capture_IR:
        if (TMSBit = = 0)
```

APPENDIX A-continued

```
                TAPState = Shift_IR;
        else
                TAPState = Exit1_IR;
        return;
    case Shift_IR:
        if (TMSBit == 1)
        {
            TAPState = Exit1_IR;
            return;
        }
        oldHighBit = (BoundaryTAPIRState & 0x8)> >3;
        // Shift in new TAP bit and switch modes
        switch (BoundaryTAPIRState)
        {
            case Boundary_Extest:
            case Boundary_1000:
                if (TDIBit == 0)
                    BoundaryTAPIRState = Boundary Extest;
                else
                    BoundaryTAPIRState = Boundary_IDCode;
                break;
            case Boundary_IDCode:
            case Boundary_1001:
                if (TDIBit == 0)
                    BoundaryTAPIRState = Boundary_Sample_Preload;
                else
                    BoundaryTAPIRState = Boundary_Intest;
                break;
            case Boundary_Sample_Preload:
            case Boundary_1010:
                if (TDIBit == 0)
                    BoundaryTAPIRState = Boundary_Clamp;
                else
                    BoundaryTAPIRState = Boundary_HighZ;
                break;
            case Boundary_Intest:
            case Boundary_1011:
                if (TDIBit == 0)
                    BoundaryTAPIRState = Boundary_0110;
                else
                    BoundaryTAPIRState = Boundary_0111;
                break;
            case Boundary_Clamp:
            case Boundary_1100:
                if (TDIBit == 0)
                    BoundaryTAPIRState = Boundary_1000;
                else
                    BoundaryTAPIRState = Boundary_1001;
                break;
            case Boundary_HighZ:
            case Boundary_1101:
                if (TDIBit == 0)
                    BoundaryTAPIRState = Boundary_1010;
                else
                    BoundaryTAPIRState = Boundary_1011;
                break;
            case Boundary_0110:
            case Boundary_1110:
                if (TDIBit == 0)
                    BoundaryTAPIRState = Boundary_1100;
                else
                    BoundaryTAPIRState = Boundary_1101;
                break;
            case Boundary_0111:
            case Boundary_Bypass:
                if (TDIBit == 0)
                    BoundaryTAPIRState = Boundary_1110;
                else
                    BoundaryTAPIRState = Boundary_Bypass;
                break;
        }
        TDIBit = (Proc1TAPIRState & 0x8)> >3;
        // Shift in new TAP bit and switch modes
        switch (Proc1TAPIRState)
        {
            case Proc1_Extest:
            case Proc1_1000:
                if (TDIBit == 0)
```

APPENDIX A-continued

```
            Proc1TAPIRState = Proc1_Extest;
        else
            Proc1TAPIRState = Proc1_HighZ;
        break;
    case Proc1_HighZ:
    case Proc1_1001:
        if (TDIBit = = 0)
            Proc1TAPIRState = Proc1_Sample_Preload;
        else
            Proc1TAPIRState = Proc1_0011;
        break;
    case Proc1_Sample_Preload:
    case Proc1_1010:
        if (TDIBit = = 0)
            Proc1TAPIRState = Proc1_Clamp;
        else
            Proc1TAPIRState = Proc1_0101;
        break;
    case Proc1_0011:
    case Proc1_1011:
        if (TDIBit = = 0)
            Proc1TAPIRState = Proc1_Private;
        else
            Proc1TAPIRState = Proc1_0111;
        break;
    case Proc1_Clamp:
    case Proc1_1100:
        if (TDIBit = = 0)
            Proc1TAPIRState = Proc1_1000;
        else
            Proc1TAPIRState = Proc1_1001;
        break;
    case Proc1_0101:
    case Proc1_1101:
        if (TDIBit = = 0)
            Proc1TAPIRState = Proc1_1010;
        else
            Proc1TAPIRState = Proc1_1011;
        break;
    case Proc1_Private:
    case Proc1_1110:
        if (TDIBit = = 0)
            Proc1TAPIRState = Proc1_1100;
        else
            Proc1TAPIRState = Proc1_1101;
        break;
    case Proc1_0111:
    case Proc1_Bypass:
        if (TDIBit = = 0)
            Proc1TAPIRState = Proc1_1110;
        else
            Proc1TAPIRState = Proc1_Bypass;
        break;
    }
    return;
case Exit1_IR:
    if (TMSBit = = 0)
        TAPState = Pause_IR;
    else
        TAPState = Update_IR;
    return;
case Pause_IR:
    if (TMSBit = = 1)
        TAPState = Exit2_IR;
    return;
case Exit2_IR:
    if (TMSBit = = 0)
        TAPState = Shift_IR;
    else
        TAPState = Update_IR;
    return;
case Update_IR:
    switch (BoundaryTAPIRState)
        {
        case Boundary_IDCode:
            // Reload Boundary Device ID register and set boundary
scan chain as pass-through.
            BoundaryDeviceIDRegister = BoundaryDeviceID;
            break;
```

APPENDIX A-continued

```
                case Boundary_Clamp:
                    // Update Boundary outputs
                    break;
            }
            if (TMSBit == 0)
                TAPState = Run_Test_Idle;
            else
                TAPState = Select_DR_Scan;
            return;
        }
        return;
}
/************************************************************************
*
* FUNCTION: ResetStateMachine
*
* DESCRIPTION: This function resets the state machine.
*
* PARAMETERS: none
*
* RETURNED: state machine globals are updated.
*
* REVISION HISTORY:
*
************************************************************************/
static void ResetStateMachine(void)
{
    TAPState = Test_Logic_Reset;
    BoundaryTAPIRState = Boundary_Extest;
    Proc1TAPIRState = Proc1_Extest;
    BoundaryBypassed = false;
    Proc1Bypassed = false;
    // Set Boundary to pass-through mode.
    // Set Proc1 to pass-through mode.
    return;
}
```

What is claimed is:

1. An on-chip debugging system emulator, comprising:
an on-chip debugging host processor;
an on-chip debugging emulator processor configured to em late the on-chip debugging functions of a silicon chip; and
a hardware interface between the on-chip debugging host processor and the on-chip debugging emulator processor;
wherein the hardware interface includes an emulator interface.

2. The on-chip debugging system emulator of claim 1, wherein the on-chip debugging host processor is a computer processor.

3. The on-chip debugging system emulator of claim 1, wherein the on-chip debugging host processor is resident in a personal computer.

4. The on-chip debugging system emulator of claim 1, wherein the on-chip debugging emulator processor is a computer processor.

5. The on-chip debugging system emulator of claim 1, wherein the on-chip debugging emulator processor is resident in a personal computer.

6. The on-chip debugging system emulator of claim 1, wherein the on-chip debugging emulator processor is resident in a personal digital assistant.

7. The on-chip debugging system emulator of claim 1, wherein the on-chip debugging emulator processor is resident in a handheld computer.

8. The on-chip debugging system emulator of claim 1, wherein the hardware interface includes a JTAG interface.

9. An on-chip debugging system emulator, comprising:
an on-chip debugging host processor running software configured to display on-chip debugging emulation information;
an on-chip debugging emulator processor running software configured to emulate the on-chip debugging functions of a silicon chip; and
a hardware interface between the on-chip debugging host processor and the on-chip debugging emulator processor;
wherein the hardware interface includes a JTAG interface and an emulator hardware interface.

10. The on-chip debugging system emulator of claim 9, wherein the on-chip debugging host processor is a computer processor.

11. The on-chip debugging system emulator of claim 9, the on-chip debugging host processor is resident in a personal computer.

12. The on-chip debugging system emulator of claim 9, wherein the on-chip debugging emulator processor is a computer processor.

13. The on-chip debugging system emulator of claim 9, wherein the on-chip debugging emulator processor is resident in a personal computer.

14. The on-chip debugging system emulator of claim 9, wherein the on-chip debugging emulator processor is resident in a personal digital assistant.

15. The on-chip debugging system emulator of claim 9, wherein the on-chip debugging emulator processor is resident in a handheld computer.

16. An on-chip debugging emulator, comprising:
a processor;
a memory device coupled to the processor;
an interface coupled to the processor, the interface configured to be coupled to an on-chip debugging host device; and a software program configured to run on the processor and emulate on-chip debugging functions of a silicon chip;

wherein the hardware interface includes an emulator hardware interface.

17. The on-chip debugging emulator of claim 16, wherein the processor and the memory device are resident in a personal computer.

18. The on-chip debugging emulator of claim 16, wherein in the processor and the memory device are resident in a computer workstation.

19. The on-chip debugging emulator of claim 16, wherein the processor and the memory device are resident in a personal digital assistant.

20. The on-chip debugging emulator of claim 16, wherein the interface includes a JTAG interface.

21. The on-chip debugging emulator of claim 16, wherein the computer program emulates an on-chip debugging system using JTAG instructions.

* * * * *

UNITED STATES PATENT AND TRADEMARK OFFICE
CERTIFICATE OF CORRECTION

PATENT NO. : 6,691,251 B2
DATED : February 10, 2004
INVENTOR(S) : Yoon Kean Wong It is certified that error appears in the above-identified patent and that said Letters Patent is hereby corrected as shown below:

Column 17,
Line 39, replace the words "em late" with the word -- emulate --.

Column 18,
Line 47, insert the word -- wherein -- before the word "the".
Line 64, insert the word -- to -- before the word "emulate".

Column 19,
Line 9, delete the word "in".

Signed and Sealed this

Eighteenth Day of October, 2005

JON W. DUDAS
*Director of the United States Patent and Trademark Office*